United States Patent

Yoshida

[11] Patent Number: 5,737,966
[45] Date of Patent: Apr. 14, 1998

[54] PRESSING MACHINE WITH RECIPROCATING SLIDE

[75] Inventor: Akihiro Yoshida, Gifu-ken, Japan

[73] Assignee: Kabushiki Kaisha Yamada Dobby, Aichi-ken, Japan

[21] Appl. No.: 580,179

[22] Filed: Dec. 28, 1995

[30] Foreign Application Priority Data

Oct. 30, 1995 [JP] Japan .................. 7-303376

[51] Int. Cl.$^6$ .............................................. F16H 21/22
[52] U.S. Cl. .................. 74/44; 74/24; 74/67; 74/603
[58] Field of Search ................... 74/24, 44, 67, 74/603, 595

[56] References Cited

U.S. PATENT DOCUMENTS

| | | | |
|---|---|---|---|
| 1,392,597 | 10/1921 | Ricardo | 74/67 |
| 3,229,807 | 1/1966 | Moore | 74/67 |
| 3,495,472 | 2/1970 | Long | 74/44 |
| 3,572,137 | 3/1971 | Nakano | 74/44 |
| 3,869,927 | 3/1975 | Lose | 74/44 |
| 4,165,685 | 8/1979 | Nakada | 74/44 |
| 4,697,466 | 10/1987 | Sugawara | 74/67 |
| 5,009,114 | 4/1991 | Parsons | 74/67 |
| 5,105,684 | 4/1992 | Imanishi | 74/44 |
| 5,138,922 | 8/1992 | Eigenmann | 74/44 |
| 5,287,728 | 2/1994 | Yoshida | 74/40 |

FOREIGN PATENT DOCUMENTS

| | | | |
|---|---|---|---|
| 368531 | 5/1990 | European Pat. Off. | 74/67 |
| 2637341 | 8/1988 | France | 74/67 |
| 63-10099 | 1/1988 | Japan | B30B 1/26 |
| 6114599 | 4/1994 | Japan | B30B 15/06 |

Primary Examiner—Charles A. Marmor
Assistant Examiner—David M. Fenstermacher
Attorney, Agent, or Firm—Webb Ziesenheim Bruening Logsdon Orkin & Hanson, P.C.

[57] ABSTRACT

A pressing machine includes a first connection device rotatably carried on an eccentric portion of a crankshaft, a second connection means for connecting the first connection device to a moving member, and a restriction device for restricting the moving direction of the second connection device to a reciprocating direction of the moving member. The second connection device includes one or more eccentric shafts each provided with a main shaft portion and an eccentric shaft portion each of which has an axis extending in the axial direction of the crankshaft, each of the eccentric shafts being rotatably connected at the main shaft portion thereof to the moving member and also rotatably connected at the eccentric shaft portion thereof to the first connection device.

7 Claims, 8 Drawing Sheets

PRESSING MACHINE WITH RECIPROCATING SLIDE

BACKGROUND OF THE INVENTION

1. Field of the Invention

The present invention relates to a pressing machine wherein moving members such as a slide and a dynamic weight are reciprocated by a rotating motion of a crankshaft.

2. Description of the Prior Art

There are known pressing machines wherein the displacement speed of a slide is decreased in the vicinity of the bottom dead center. They are, for example, a pressing machine (see, for example, Japanese Patent Appln. Public Disclosure No. 63-10099) wherein a uniform rotational motion of a crankshaft is converted to a non-uniform reciprocating motion by means of a motion converting mechanism such as a link mechanism and the non-uniform reciprocating motion is transmitted to a slide, and a pressing machine (see, for example, Japanese Patent Appln. Public Disclosure No. 6-114599) wherein a uniform rotational motion of a flywheel is converted to a non-uniform rotational motion by means of a motion converting mechanism such as a rotation transfer mechanism and the non-uniform rotational motion is transmitted to a crank shaft.

In this type of such conventional pressing machines, however, the motion converting mechanism requires a large number of parts, thus causing the problem of complicated structure and high cost.

SUMMARY OF THE INVENTION

It is an object of the present invention to decrease the number of parts required in the motion converting mechanism.

In a pressing machine having at least one moving member which is reciprocated by a rotating motion of a crankshaft supported by a frame, the present invention is characterized by including a first connection means carried rotatably on an eccentric portion of the crank shaft and a second connection means for connecting the first connection means to the moving member, the second connection means including one or more eccentric shafts each provided with a main shaft portion and an eccentric shaft portion each of which has an axis extending in the axial direction of the crankshaft, each eccentric shaft being connected at the main shaft portion thereof to the moving member rotatably and further connected at the eccentric shaft portion thereof to the first connection means rotatably.

When the crankshaft is rotated, the first connection means performs an eccentric motion proportional to both the amount of eccentricity of the eccentric portion of the crankshaft and that of the eccentric shaft portion of each eccentric shaft, while the second connection means is reciprocated in the reciprocating direction of the moving member in proportion to the amount of eccentricity of the crankshaft and that of the eccentric shaft, whereby the moving member, e.g. a slide or a dynamic weight, is reciprocated. The range of the reciprocative movement of the moving member depends on the amount of eccentricity of the crankshaft, and the amount of change in the displacement speed of the slide near the bottom dead center is related to both the amount of eccentricity of the eccentric shaft portion relative to the main shaft portion of the eccentric shaft and that of the eccentric portion relative to a main portion of the crank shaft.

According to the present invention, since the rotating motion of the crank shaft is converted to a reciprocating motion by the first connection means and the eccentric shaft of the second connection means and the reciprocating motion is transmitted to the moving member, the number of parts required in the motion converting mechanism is small and hence the structure is simplified and the cost is reduced.

Preferably, the moving member includes a slide and a dynamic weight which are disposed on opposite sides to each other with respect to the rotational axis of the crankshaft; the crankshaft has first and second eccentric portions which are eccentric in directions opposite to each other; the first connection means is provided with a first connector connected rotatably to the first eccentric portion of the crankshaft and a second connector connected rotatably to the second eccentric portion of the crankshaft; the first connector is connected to the slide through at least one eccentric shaft, while the second connector is connected to the dynamic weight through at least another eccentric shaft. According to this construction, vibrations caused by the motion between the first connection means and the slide are offset by vibrations caused by the motion between the second connection means and the dynamic weight.

In a preferred embodiment, the first connection means and the moving member are interconnected through the eccentric shafts in two spaced positions; the diameter of the eccentric shaft portion of each eccentric shaft is larger than that of the main shaft portion of the same shaft; the amount of eccentricity of the eccentric shaft portion relative to the main shaft portion of the eccentric shaft is larger than that of the eccentric portion relative to the main portion of the crank shaft. Further, it includes restriction means for restricting the moving direction of the axis of the main shaft portion to the reciprocating direction of the moving member.

Preferably, the pressing machine includes a restriction means for restricting the moving direction of the axis of the main shaft portion to the reciprocating direction of the moving member, whereby the moving direction of the main shaft portion is surely restricted to the reciprocating direction of the moving body and, therefore, the operation of the motion converting mechanism becomes stable.

Preferably, the pressing machine further includes an auxiliary shaft which is supported rotatably by a frame so as to extend in parallel with the crankshaft and which is rotated in synchronism with the crankshaft; the auxiliary shaft has an auxiliary eccentric portion in corresponding relation to the eccentric portion of the crankshaft; and the first connection means is supported rotatably by the auxiliary eccentric portion. According to this construction, it is possible to prevent such a displacement of the first connection means as causes an arcuate displacement of the axis of the eccentric shaft about the crankshaft with eccentric motion of the first connection means and, therefore, the operation of the motion converting mechanism becomes more stable.

Further advantages of the present invention will become apparent to those with ordinary skill in the art upon reading and understanding the following detailed description of the preferred and alternate embodiments.

BRIEF DESCRIPTION OF THE DRAWINGS

The invention will be described in conjunction with certain drawings which are for the purpose of illustrating the preferred embodiment of the invention and its modifications only, and not for the purpose of limiting the same and wherein.

DESCRIPTION OF THE PREFERRED EMBODIMENTS

Figure 1:
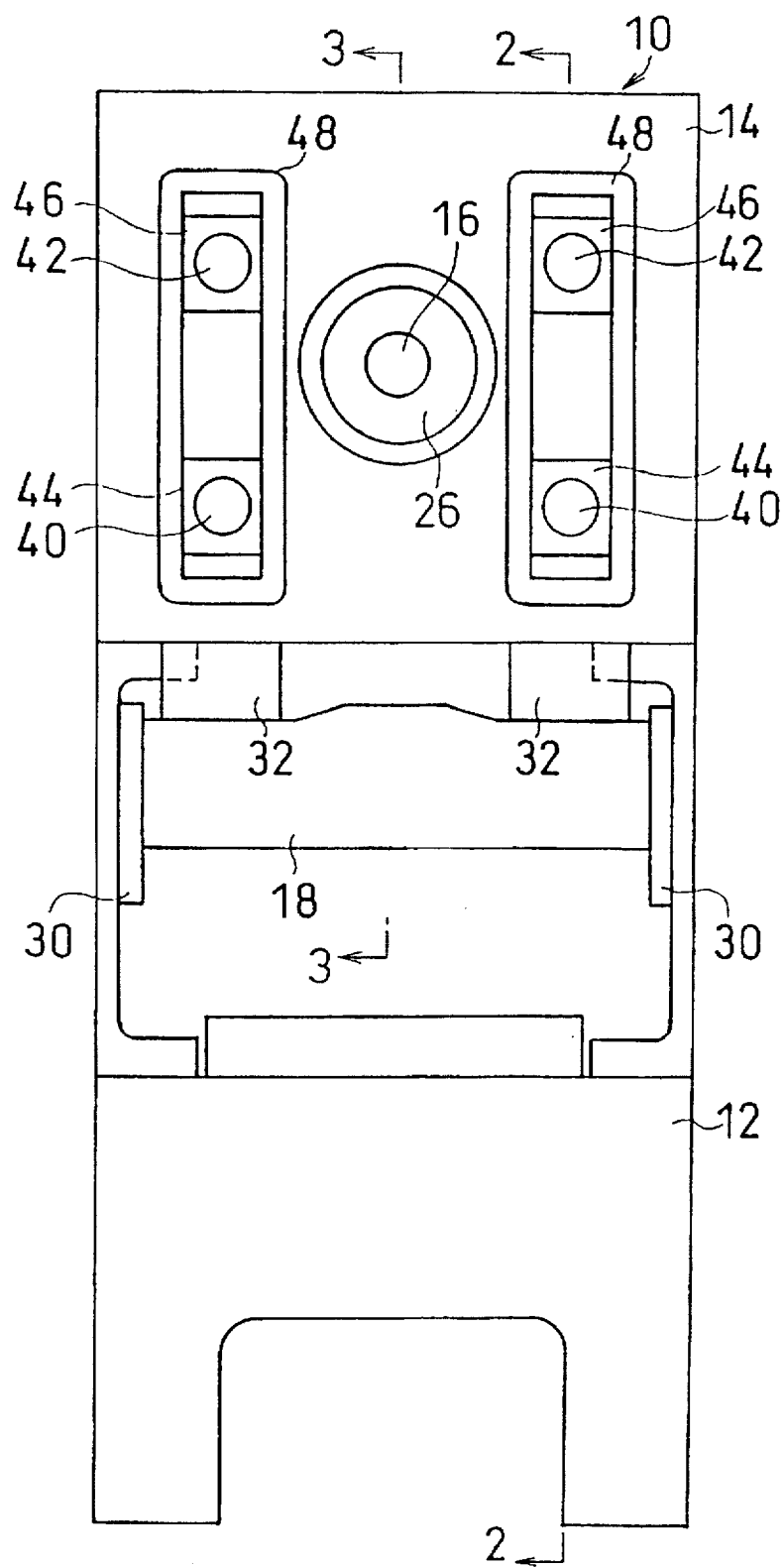
FIG. 1 is a front view of a pressing machine showing an embodiment of the present invention.
Figure 2:
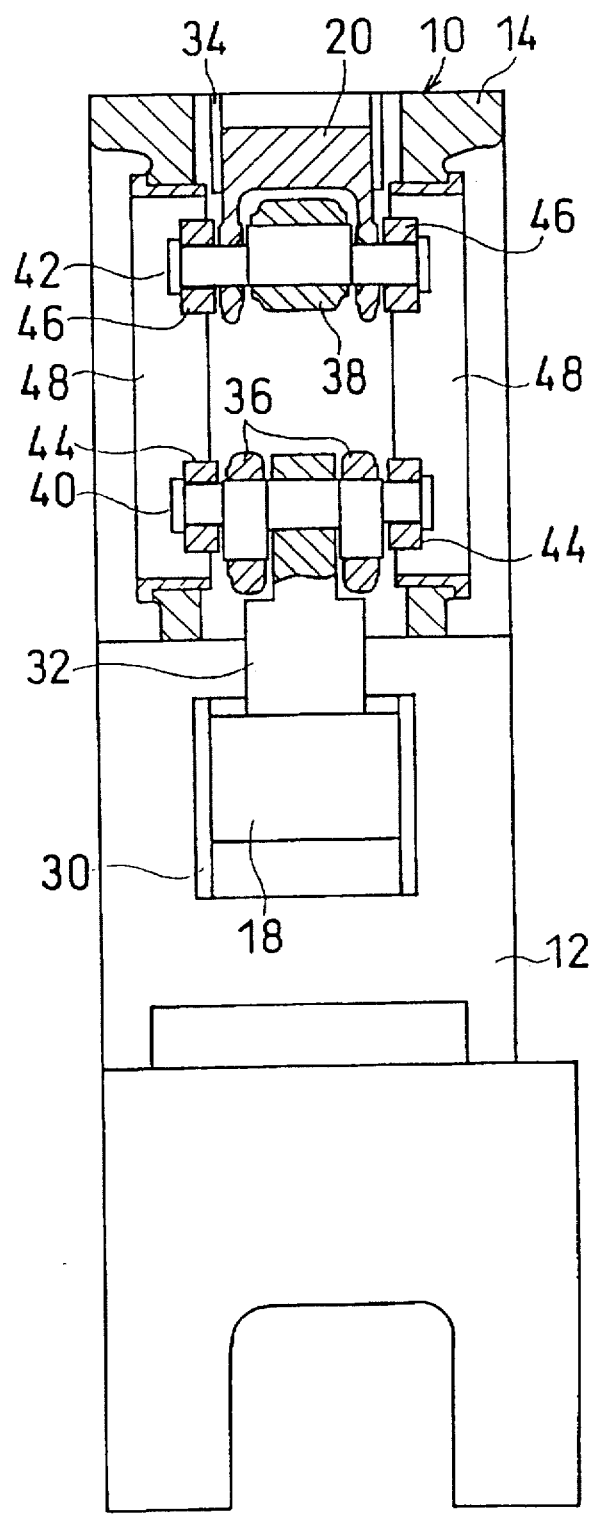
FIG. 2 is an end view taken along line 2—2 in FIG. 1.

Referring to FIGS. 1 to 4, a pressing machine 10 includes a lower frame 12 for resting a lower die thereon, an upper frame 14 mounted onto the lower frame 12, a crankshaft 16 disposed in the upper frame 14, a slide 18 for mounting of an upper die thereto, and a dynamic weight 20.

Figure 3:
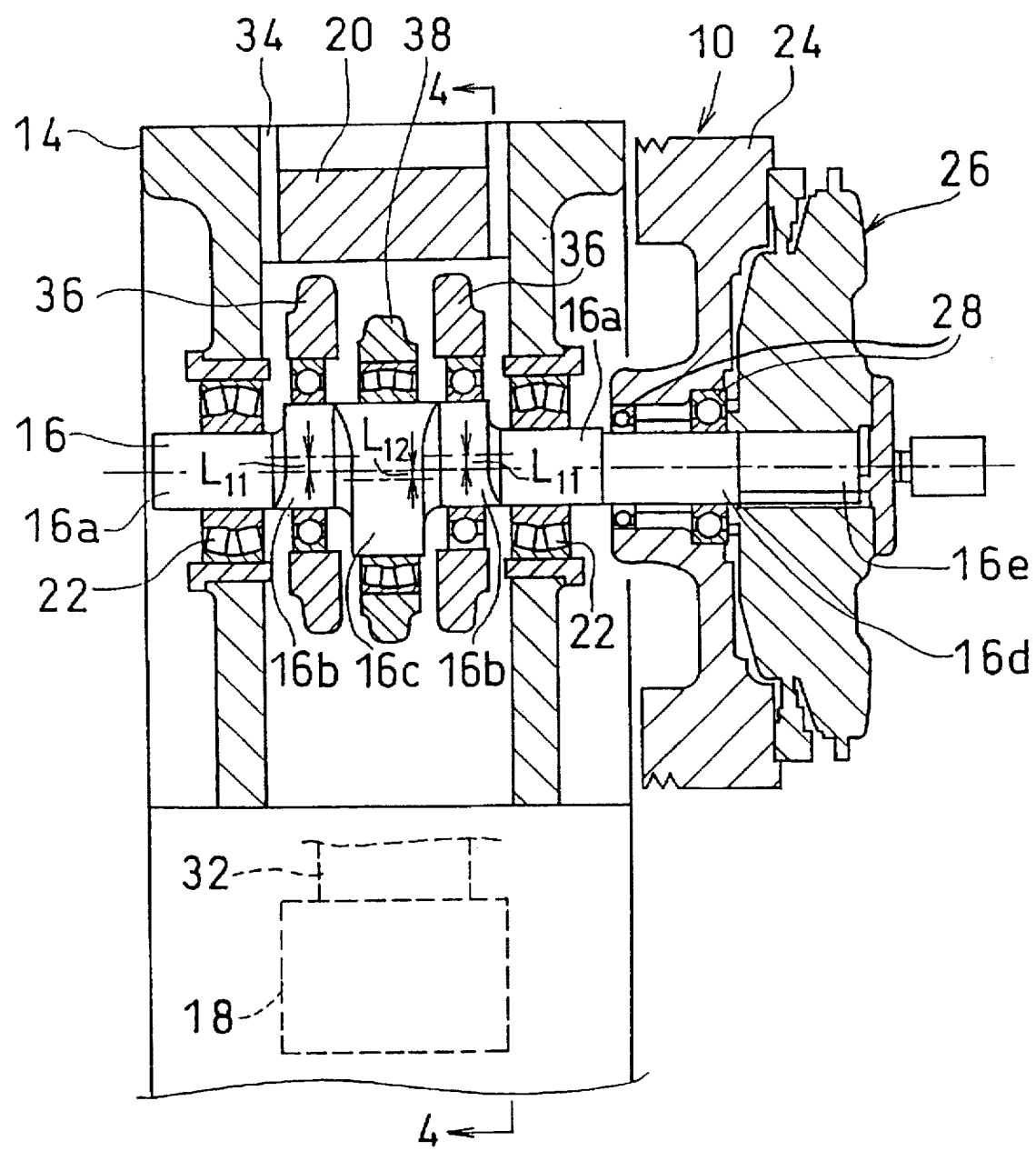
FIG. 3 is an end view taken along line 3—3 in FIG. 1.
Figure 4:
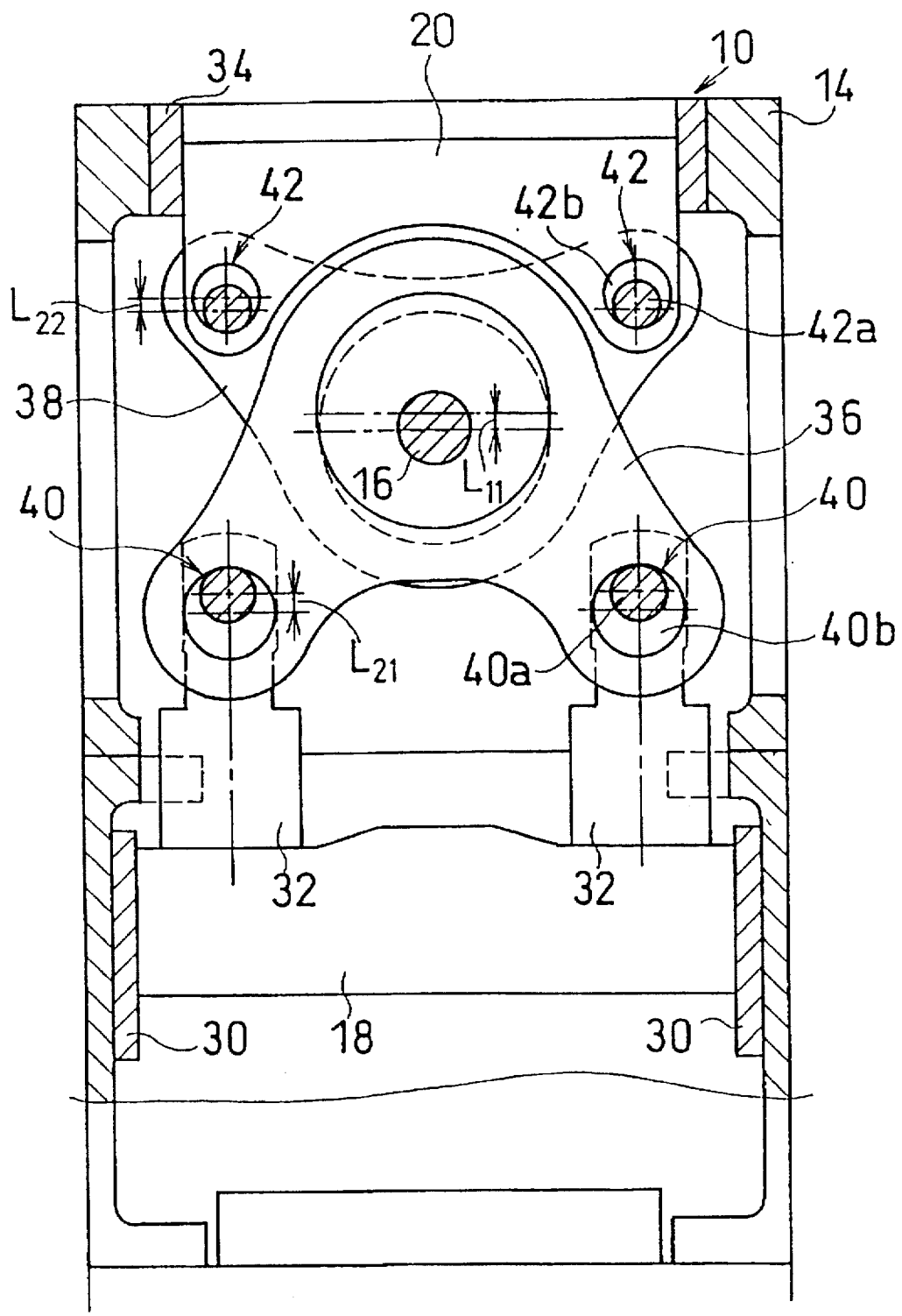
FIG. 4 is an end view taken along line 4—4 in FIG. 3.

As shown in FIG. 3, the crank shaft 16 is supported by the upper frame 14 through plural bearings 22 so as to be rotatable about an axis extending in the horizontal direction, and it receives a uniform rotational motion of a flywheel 24 through a clutch mechanism 26. The flywheel 24 is supported rotatably on the crankshaft 16 through plural bearings 28. The clutch mechanism 26 is mounted on the crankshaft 16.

Figure 5:
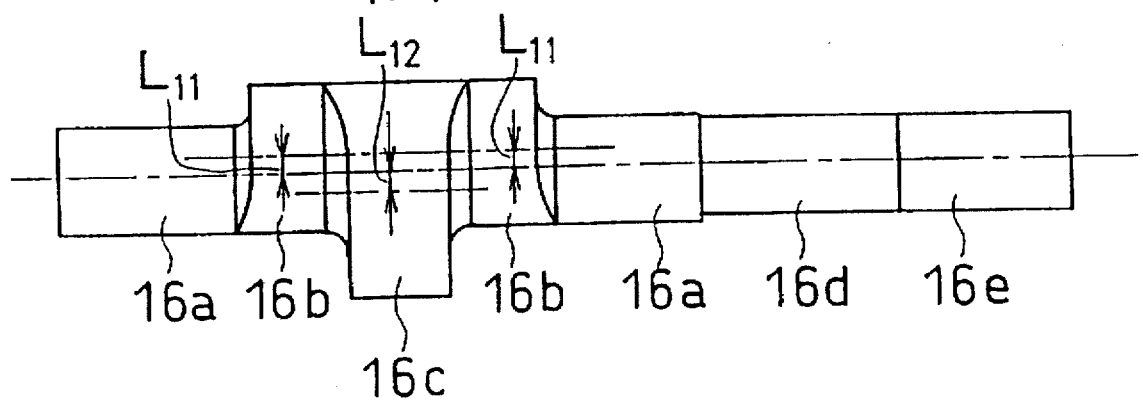
FIG. 5 is a diagram showing an embodiment of a crankshaft as well as first and second eccentric shafts, in which (A), (B) and (C) are front views of the crankshaft, the first eccentric shaft and the second eccentric shaft, respectively.
Figure 5:
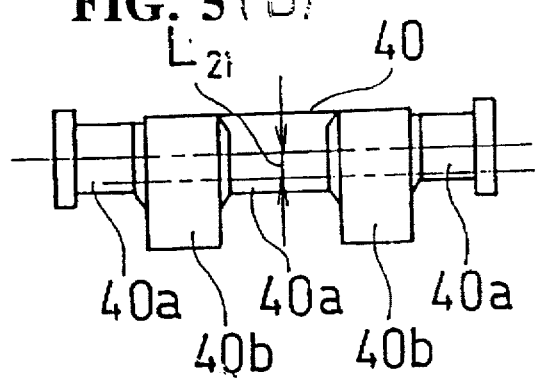
Figure 5:
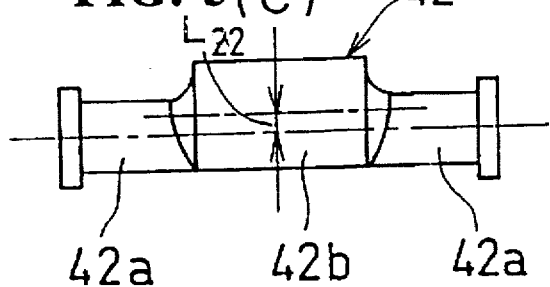

As shown in FIGS. 3 and 5(A), the crankshaft 16 has a pair of main portions 16a supported rotatably by the frame 14, a pair of first eccentric portions 16b which are displaced on the same side with respect to the axis of the main portions 16a, a second eccentric portion 16c which is eccentric on the side opposite to the first eccentric portions 16b with respect to the axis of the main portions 16a, a first support portion 16d which supports the flywheel 24, and a second support portion 16e which supports the clutch mechanism 26. The second eccentric portion 16c is formed between the first eccentric portions 16b. The amount of eccentricity of the first eccentric portions 16b and that of the second eccentric portion 16c with respect to the main portions 16a are L11 and L12, respectively, in terms of distances. The axis of the first and second support portions 16d, 16e is the same as that of the main portions 16a.

A main portion of the slide 18 is mounted by a pair of opposed slide guides 30 to the lower frame 12 vertically movably and below the rotational axis of the crankshaft 16, and it is provided with a pair of connecting rod portions 32 extending vertically over both frames 12 and 14. Both connecting rod portions 32 extend from both ends of the main portion of the slide 18 upwardly in parallel with each other and are reciprocated vertically by means of a motion converting mechanism which converts the rotating motion of the crankshaft 16 into a vertically reciprocating motion.

The dynamic weight 20 is mounted to the upper frame 14 vertically movably through a pair of opposed weight guides 34 on the side opposite to the slide 18 with respect to the rotational axis of the crankshaft 16. The dynamic weight 20 is also reciprocated vertically in synchronism with the slide 18 by means of the motion converting mechanism.

A movable direction of the slide 18 is restricted vertically at its main portion by the slide guides 30, while the moving direction of the dynamic weight 20 is restricted vertically by the weight guides 34. Likewise, a movable direction of the connecting rod portions 32 of the slide 18 may also be restricted vertically by a suitable restriction means.

The motion converting mechanism for converting a rotating motion into a reciprocating motion is provided with two first yokes, or first connectors 36, first connection means which are rotatably carried on the crankshaft 16, a second yoke, or a second connector 38, third connection means which is rotatably carried on the crankshaft 16, a pair of first eccentric shafts 40 second connection means for connecting the connectors 36 to the connecting rod portions 32 of the slide 18, a pair of second eccentric shafts 42 both connection means for connecting the connector 38 to the weight 20, first sliders 44 mounted rotatably to end portions of the first eccentric shafts 40, second sliders 46 mounted rotatably to end portions of the second eccentric shaft 42, and a pair of slider guides 48 which are mounted to the upper frame 14 to restrict vertically the moving direction of the sliders 44 and 46.

Each of the first connectors 36 is rotatably mounted at its upper portion to the first eccentric portion 16b of the crankshaft 16 through a bearing, while the second connector 38 is rotatably connected at its lower portion to the second eccentric portion 16c of the crankshaft 16 through a bearing.

Each of the first eccentric shafts 40 has three main shaft portions 40a and a pair of eccentric shaft portions 40b, as shown in FIG. 5(B). The centrally located main shaft portions 40a of both first eccentric shafts 40 are mounted rotatably to the upper ends of the connecting rod portions 32 of the slide 18, and the eccentric shaft portions 40b of both first eccentric shafts 40 are mounted rotatably to the lower ends of both first connectors 36.

Each of the second eccentric shafts 42 has a pair of main shaft portions 42a and an eccentric shaft portion 42b formed between both main shaft portions 42a, as shown in FIG. 5(C). The main shaft portions 42a of both second eccentric shafts 42 are mounted rotatably to the upper end portion of the second connector 38, while the eccentric shaft portions 42b of both second eccentric shafts 42 are mounted rotatably to the lower end portion of the weight 20.

The eccentric shaft portions 40b and 42b are larger in diameter than the main shaft portions 40a and 42a, respectively. The amount of eccentricity, L21, of the eccentric shaft portions 40b relative to the main shaft portions 40a is larger than the amount of eccentricity, L11, of the first eccentric portions 16b relative to the main portion 16a of the crankshaft 16, and the amount of eccentricity, L22, of the eccentric shaft portion 42b relative to the main shaft portions 42a is larger than the amount of eccentricity, L12, of the second eccentric portion 16c relative to the main portions 16a.

Each of the sliders 44 is respectively mounted rotatably to the main shaft portion 40a at the end portion of the first eccentric shaft 40, while each of the sliders 46 is respectively mounted rotatably to the main shaft portion 42a of the second eccentric shafts 42. The sliders 44 and 46 are fitted in the slider guides 48 so as to be movable only in the vertical direction to restrict the moving direction of the axes of the eccentric shafts 40 and 42 (the axes of the eccentric portions 40a and 40b) only to the vertical direction.

The motion converting mechanism including the first and second connectors 36, 38 and the first and second eccentric shafts 40, 42, is mounted to the pressing machine 10 so that the weight 20 may be positioned at the bottom dead center when the slide 18 is positioned at the top dead center and so that the weight 20 may be positioned at the top dead center when the slide 18 is positioned at the bottom dead center.

Upon rotation of the crankshaft 16 in the pressing machine 10, the crankshaft 16-side portion of the connector 36 performs an eccentric motion around the eccentric portions 16b of the crankshaft 16, while the eccentric shaft 40-side portion of the connector 36 performs a pivotal motion, i.e. swinging motion, within a predetermined angular range centered on the axis of the eccentric portions 40b. With such eccentric motion of the connector 36, the eccentric shaft 40 is moved pivotally about the main shaft portions 40a.

However, the moving direction of the axes of the eccentric shafts 40 (the axes of the eccentric portions 40a) is limited to the vertical direction by the sliders 44 and the slider guides 48, and the amount of eccentricity, L11, is smaller than the amount of eccentricity, L21, and therefore, with the eccentric motion of the connector 36, the eccentric shaft 40 is reciprocated vertically only by a value corresponding to the difference between L11 and L21, whereby the slide 18 is reciprocated vertically. The range of the reciprocative movement of the slide 18 is determined by the amount of eccentricity L11.

The above process will now be explained with reference to FIGS. 6 and 7. In these figures, the reference numerals 50a and 50b represent axes of the main portions 16a and eccentric portions 16b, respectively, of the crank shaft 16; the numerals 52a and 52b represent axes of the main shaft portions 40a and eccentric shaft portions 40b, respectively, of the eccentric shafts 40; and the symbol θ represents a rotational angle of the crank shaft 16. In both figures it is assumed that the crankshaft 18 is rotated in the counter-clockwise direction.

When the slide is positioned at the top dead center, as shown in FIG. 6(A), the rotational angle θ of the crankshaft 16 is zero, and the amount of eccentricity of the eccentric portions 16b relative to the main portions 16a and that of the eccentric shaft portions 40b relative to the main shaft portions 40a are L11 and L21, respectively.

When the crankshaft 16 is rotated by 30 degrees, as shown in FIG. 6(B), the connectors 36 are rotated by 30 degrees about the axis 50b of the eccentric portions 16b of the crankshaft 16, so that the eccentric shafts 40 undergo a rotating force around the axis 52a of the main shaft portions 40a thereof. In the pressing machine 10, however, since the moving direction of the axis of the eccentric portions 40a is restricted to the vertical direction, the eccentric shafts 40 are rotated about the eccentric shaft portions 40b thereof by an angle proportional to the amounts of eccentricity L11 and L21.

If L11 is equal to L21, the eccentric shafts 40 are merely rotated by a predetermined angle about the eccentric shaft portions 40b thereof. In the pressing machine 10, however, since L11 is smaller than L21, the main shaft portions 40a is displaced downward with the rotational movement about the axis 52b, whereby the slide 18 is moved downward by the corresponding distance.

Figure 6:
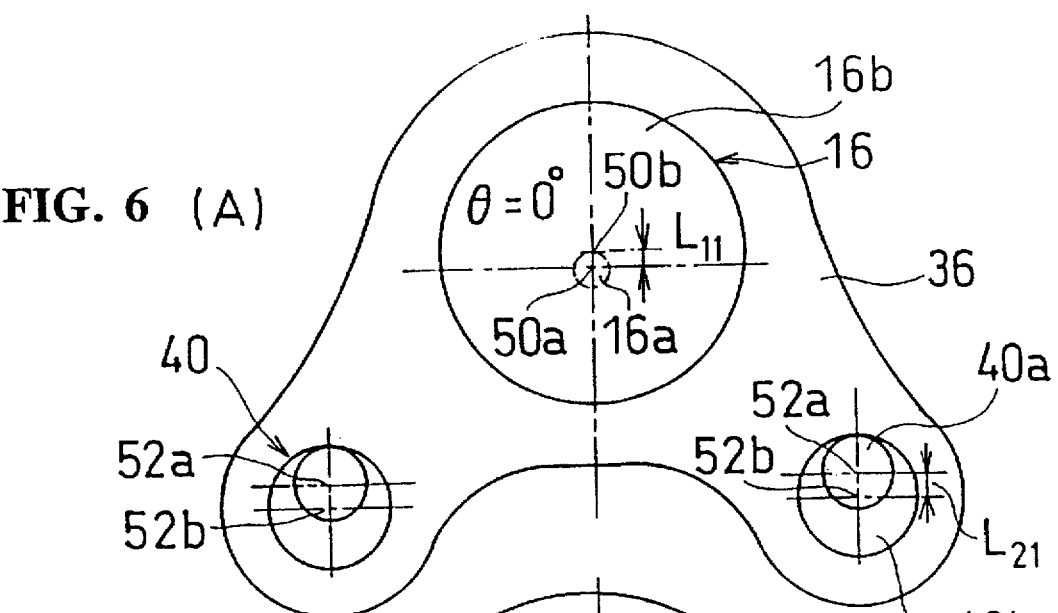
FIG. 6 is a diagram for explaining operations of a motion converting mechanism.
Figure 6:
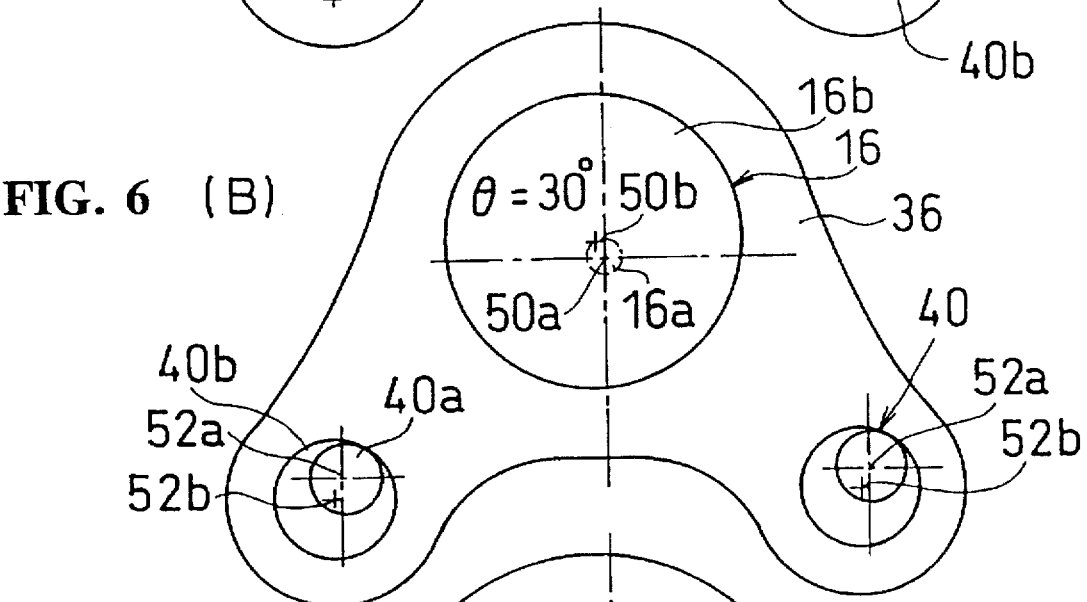
Figure 6:
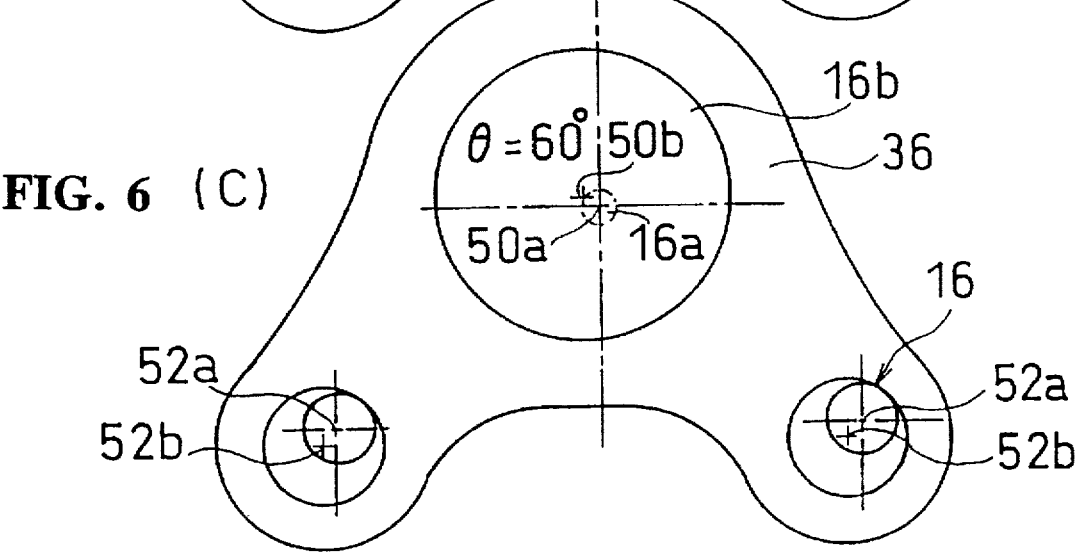
Figure 7:
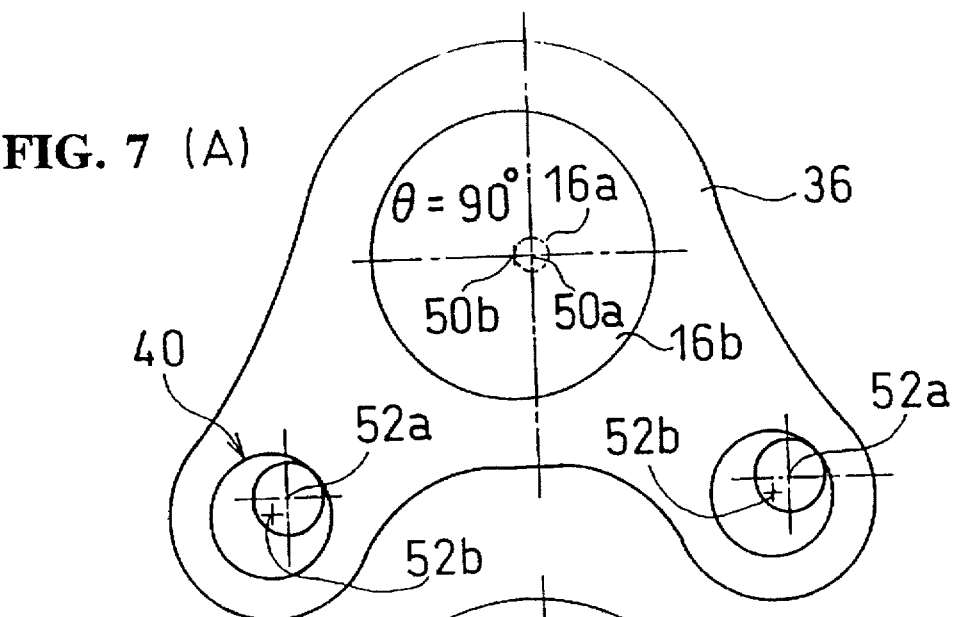
FIG. 7 is a diagram for explaining operations of the motion converting mechanism which operations follow the operations of FIG. 6.
Figure 7:
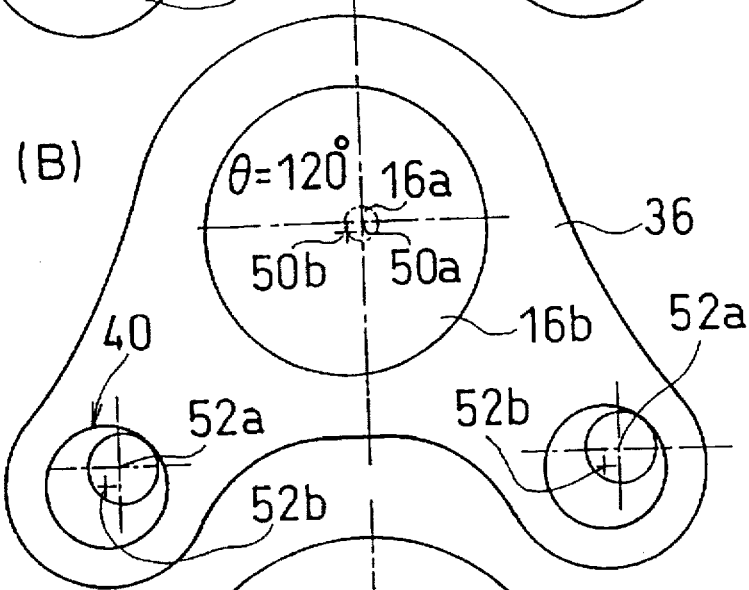
Figure 7:
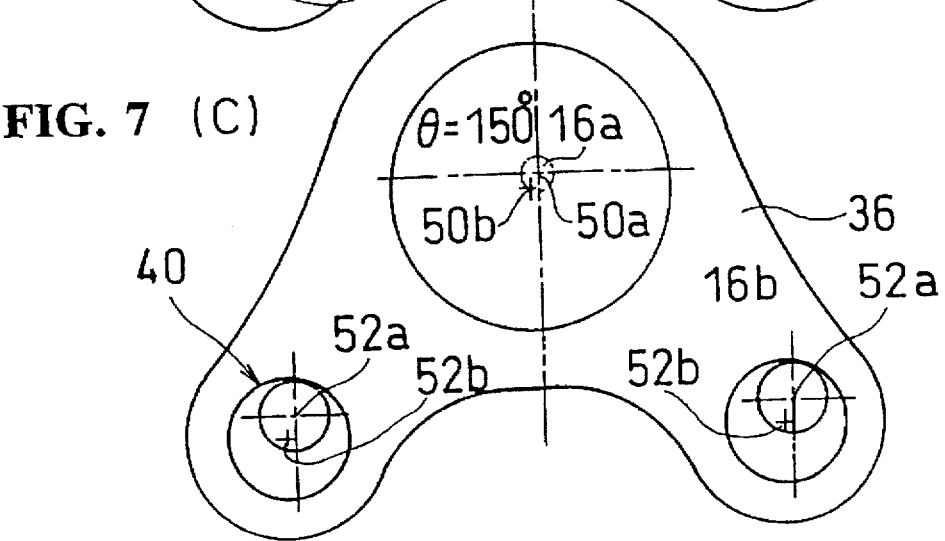

As the crankshaft 16 is further rotated up to θ=60, as shown in FIG. 6 (C), the connectors 36 are rotated about the axis 50b by the corresponding angle, and the main shaft portions 40a are rotated about the axis 52b by the corresponding angle while their moving direction is restricted to the vertical direction. Consequently, the main shaft portions 40a are further moved downward with the rotational movement about the axis 52b, and the slide 18 is further moved downward by the corresponding distance.

Subsequently, in the same manner as above, the eccentric shafts 40 and the slide 18 are moved with the rotational movement of the connectors 36 and the main shaft portions 40a which rotational movement is caused by the rotation of the crankshaft 16. In the rotational angle θ of the crankshaft 16 ranging from 0° to 180°, the moving direction of the eccentric shafts 40 and slide 18 is downward, while in the rotational angle θ ranging from 180° to 360°, the moving direction is upward. FIGS. 7 (A), (B) and (C) show in what relation the crankshaft 16, connectors 36 and eccentric shafts 40 are at crank shaft rotational angles θ of 90°, 120° and 150°, respectively.

The reciprocation range of the eccentric shafts 40 and that of the slide 18 depend on the amount of eccentricity L11 of the crankshaft 16, and the amount of change in the displacement speed of the slide 18 at the bottom dead center is related to both the amount of eccentricity L21 of the eccentric shaft portions 40b relative to the main shaft portions 40a of the eccentric shafts 40 and the amount of eccentricity L11 of the eccentric portions 16b relative to the main portions 16a of the crank shaft 16.

Since the moving direction of the second eccentric shafts 42 is also restricted in the vertical direction, the second eccentric shafts 42 and the weight 20 are also moved with the rotative movement of the connector 38 and the main shaft portions 42a which movement is induced by the rotation of the crankshaft 16, like the first eccentric shafts 40 and the slide 18.

The larger the amounts of eccentricity L11 and L12, the wider the reciprocating movement range of the slide 18 and that of the weight 20. It is optional whether L21 is equal to L22 or not. In both cases it is desirable to select L11, L12, L21 and L22 such that the L11 to L12 ratio is equal to the L21 to L22 ratio.

The closer to L11 the amount of eccentricity L21 is, the lower the displacement speed of the slide 18 in the vicinity of the bottom dead center. Likewise, the closer to L12 the amount of eccentricity L22 is, the lower the displacement speed of the weight 20 in the vicinity of the top dead center.

According to the pressing machine 10, since the motion converting mechanism can be formed by the connectors 36, 38, eccentric shafts 40, 42, the sliders 44, 46 and the slider guides 48, the number of parts required in the motion converting mechanism is small, the structure is simplified, and the cost is reduced.

In the pressing machine 10, the rotation of the crankshaft 16 is converted to both rotational motion of the connectors 36, 38 around the eccentric portions 16b, 16c and pivotal motion of the connectors 36, 38 about the axes of the main shaft portions 40a, 42a; further, the motion of the connectors 36 and 38 is converted to a rotational motion within a predetermined angular range of the eccentric shafts 40, 42 about the eccentric shaft portions 40b, 42b, and the rotational motion of the eccentric shafts 40, 42 is converted to a reciprocative movement of the main shaft portions 40a, 42a. Consequently, the reciprocating motion of the slide 18 and the weight 20 becomes a non-uniform motion wherein the displacement speed near the bottom dead center of the slide 18 is lower.

In the pressing machine 10, the moving direction of the eccentric shafts 40 and 42 is restricted directly to the moving direction of the slide 18 and weight 20 by means of the sliders 44 and 46. Accordingly, the motion converting mechanism, particularly the connectors 36, 38 and the eccentric shafts 40, 42, operate smoothly, whereby a smooth motion converting operation is performed. In the pressing machine 18 and the conventional pressing machines, the moving direction of the slide 18 and the weight 20 is restricted, so the means for directly restricting the moving direction of the eccentric shafts 40 and 42 may be omitted.

The means for directly restricting the moving direction of the eccentric shafts 40 and 42 need not always be directly restricting means like the sliders 44 and 46 in the above embodiment. There may be adopted another means. For example, the slider 44 may be substituted by means which restricts the moving direction of the connecting rod portions 32 vertically.

Figure 8:
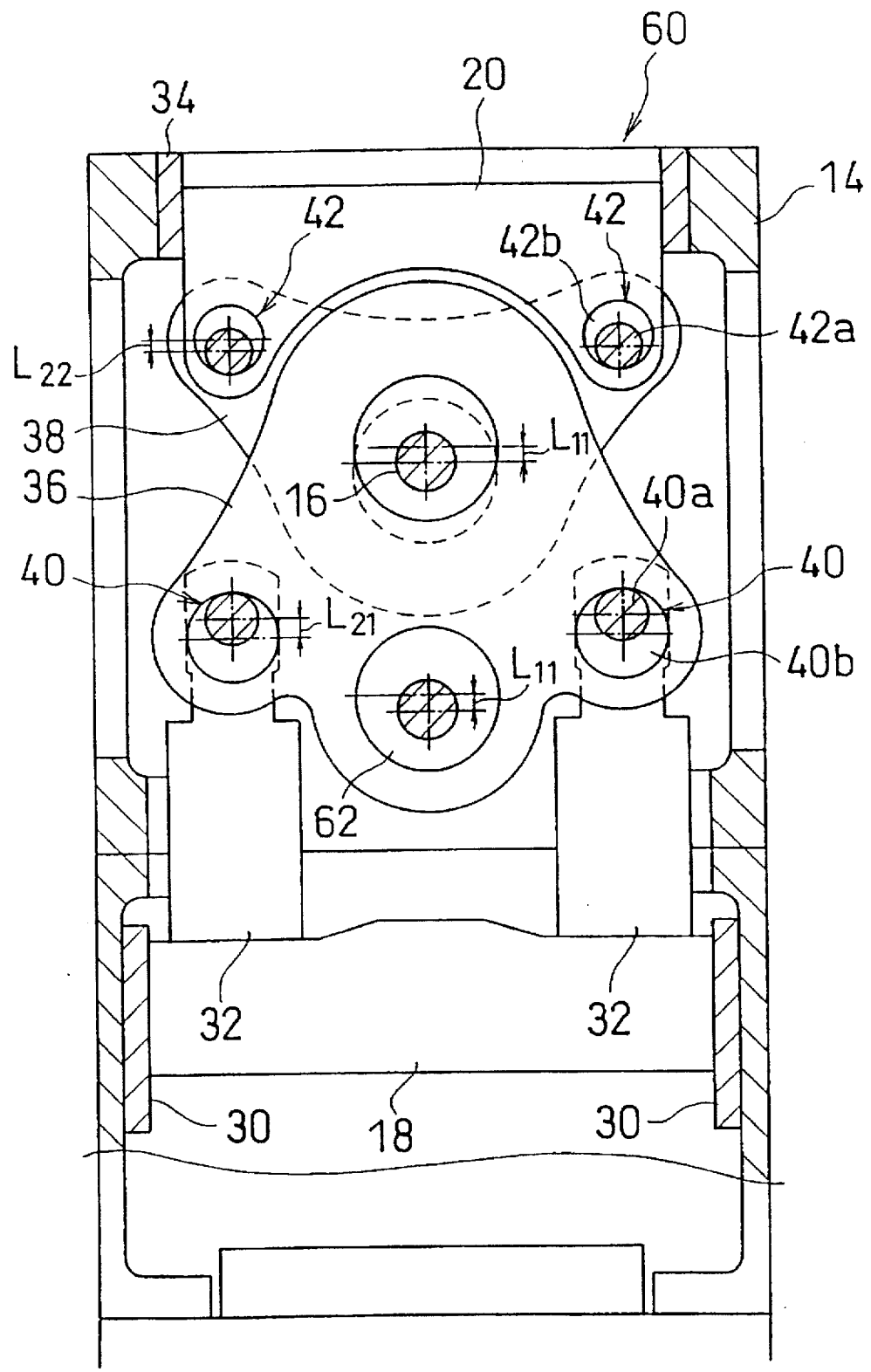
FIG. 8 is a sectional view similar to FIG. 4, showing a pressing machine according to another embodiment of the present invention.

A pressing machine 60 illustrated in FIG. 8 further includes an auxiliary shaft 62 which extends in parallel with the crankshaft 16 and which is supported by the upper frame 14 through bearings (not shown) rotatably in synchronism with the crank shaft 16. The auxiliary shaft 62 is a crankshaft provided with auxiliary eccentric portions corresponding to the first eccentric portions 16b of the crankshaft 16. The amount of eccentricity of the auxiliary eccentric portion relative to the main portion of the auxiliary shaft 62 is the same as that of the first eccentric portions 16b relative to the main portions 16a of the crankshaft 16. First connectors 36 are connected rotatably to the auxiliary eccentric portions of the auxiliary shaft 62.

With the rotation of the crankshaft 16, the auxiliary shaft 62 is rotated in the same phase as and in synchronism with the crankshaft 16. As a result, the first connectors 36 are rotated by a cooperation of the crankshaft 16 and the auxiliary shaft 62, and the eccentric shafts 40 are rotated within a predetermined angular range about the axes of the eccentric shaft portion 40b, so that the eccentric shafts 40 are reciprocated vertically and hence the slide 18 is reciprocated in the same direction.

According to the pressing machine 60, with the eccentric motion of the first connectors 36, it is possible to prevent such a displacement of the connectors 36 as causes an arcuate displacement of the axes of the eccentric shafts 40 centered on the crankshaft 16, whereby the operation of the motion converting mechanism becomes more stable.

In the pressing machine 60, there may be adopted a construction wherein in place of the auxiliary eccentric portions 40b a second auxiliary eccentric portion corresponding to the second eccentric portion 16c of the crankshaft 16 is formed as part of the auxiliary shaft 62, and the second connector 38 is connected rotatably to the second auxiliary eccentric portion. Also, the auxiliary eccentric portions 40b and a second auxiliary eccentric portion corresponding to the second eccentric portion 16c of the crankshaft 16 may be formed as part of the auxiliary shaft 62, and the second connector 38 may be connected rotatably to the second auxiliary eccentric portion. Further, a second auxiliary shaft having a second auxiliary eccentric portion corresponding to the second eccentric portion 16c of the crankshaft 16 may be provided, and the second connector 38 may be connected rotatably to the second auxiliary eccentric portion of the second auxiliary shaft.

The present invention is not limited to the above embodiments, but may also be applied to, for example, a pressing machine not using the dynamic weight 20. The present invention is further applicable to a pressing machine wherein one of the slide 18 and the weight 20 is reciprocated by the motion converting mechanism according to the invention, and the other is reciprocated by another motion converting mechanism such as a link mechanism or the like.

Although the invention has been described in its preferred embodiments, obviously, modifications and alterations will occur to those with ordinary skill in the art upon reading and understanding the present invention. It is intended that the invention be construed as including all such modifications and alterations is so far they come with the scope of the appended claims or the equivalent thereof.

What is claimed is:

1. A pressing machine having a slide which is reciprocated by a rotating motion of a crankshaft supported by a frame, the crankshaft having a main body portion and at least one first eccentric portion, the machine comprising: a first connection means carried rotatably on the at least one first eccentric portion of said crankshaft and a second connection means for connecting said first connection means to said slide, said second connection means including at least one first eccentric shaft provided with a first main shaft portion and a first eccentric shaft portion, the first main shaft portion and the first eccentric shaft portion respectively having a first main axis and a first eccentric axis extending substantially in parallel to a rotation axis of said crankshaft, said at least one first eccentric shaft being rotatably connected at the main shaft portion thereof to said slide and rotatably connected at the eccentric shaft portion thereof to said first connection means.

2. A pressing machine according to claim 1, further comprising: a dynamic weight which is disposed opposite to said slide, a third connection means rotatably received by said crankshaft, and a fourth connection means for connecting said third connection means to said dynamic weight, wherein said crankshaft includes at least one second eccentric portion which is eccentric in a direction opposite to said at least one first eccentric portion and rotatably receiving said third connection means, and wherein said fourth connection means includes at least one second eccentric shaft having a second main shaft portion and a second eccentric portion respectively having a second main axis and a second eccentric axis extending in parallel to the rotation axis of said crankshaft, said second eccentric shaft being rotatably connected at the second main shaft portion to said dynamic weight and rotatably connected at said second eccentric shaft portion to said third connection means.

3. A pressing machine according to claim 1, wherein said first connection means and said slide are connected by two first eccentric shafts at two positions spaced apart from each other.

4. A pressing machine according to claim 1, wherein the diameter of the first eccentric shaft portion of said at least one first eccentric shaft is larger than the diameter of the first main shaft portion of the at least one first eccentric shaft.

5. A pressing machine according to claim 1, wherein the amount of eccentricity of the first eccentric shaft portion relative to the first main shaft portion of the at least one first eccentric shaft is larger than the eccentricity of the first eccentric portion of said crankshaft relative to the main portion of the crankshaft.

6. A pressing machine according to claim 1, further including a restriction means for restricting the moving direction of the axis of said first main shaft portion to the reciprocating direction of said slide.

7. A pressing machine according to claim 1, further including an auxiliary shaft which is rotatably supported by the frame so as to extend substantially in parallel with said crankshaft and which is rotated in synchronism with the crankshaft, said auxiliary shaft having an auxiliary eccentric portion corresponding to the at least one first eccentric portion of the crankshaft, said auxiliary eccentric portion rotatably receiving said first connection means.

* * * * *